No. 765,807. PATENTED JULY 26, 1904.
A. A. BRIGGS.
HORSE DETACHER.
APPLICATION FILED SEPT. 11, 1903.
NO MODEL.
Fig. 2.
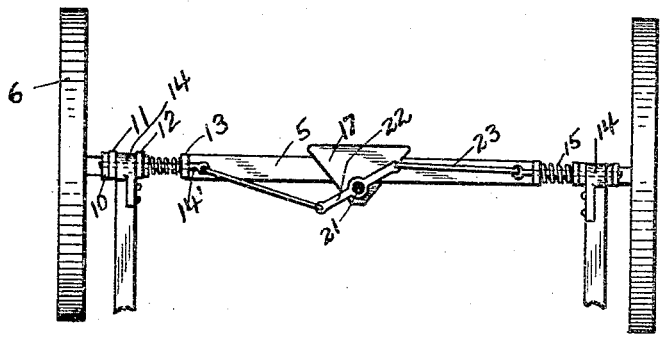
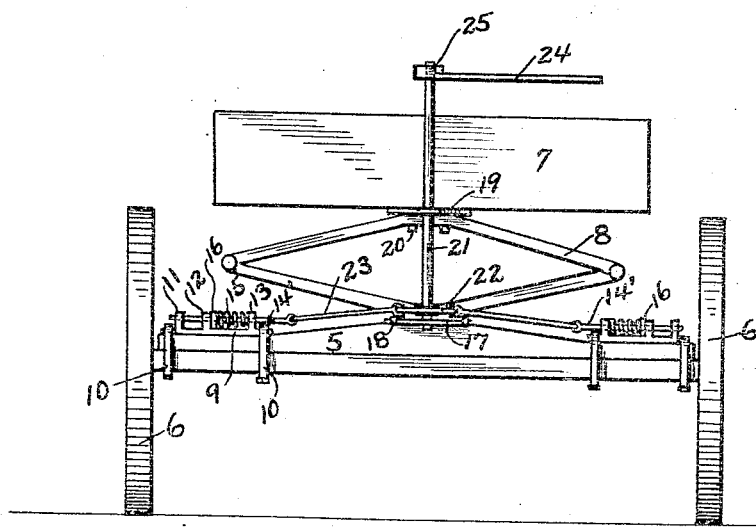
Fig. 1.
Witnesses
Charles Morgan.
Fred C. Jones
Inventor
A. A. BRIGGS.
By
Attorneys No. 765,807. Patented July 26, 1904.

UNITED STATES PATENT OFFICE.

ALBERT A. BRIGGS, OF NEW SHARON, IOWA.

HORSE-DETACHER.

SPECIFICATION forming part of Letters Patent No. 765,807, dated July 26, 1904.

Application filed September 11, 1903. Serial No. 172,808. (No model.)

*To all whom it may concern:*

Be it known that I, ALBERT A. BRIGGS, a citizen of the United States, residing at New Sharon, in the county of Mahaska, State of Iowa, have invented certain new and useful Improvements in Horse-Detachers; and I do hereby declare the following to be a full, clear, and exact description of the invention, such as will enable others skilled in the art to which it appertains to make and use the same.

This invention relates to horse-releasers; and it has for its object to provide a simple construction which may be attached readily to an ordinary vehicle and which when operated will disengage the shafts from the vehicle, and thus release the horse from the vehicle.

A further object of the invention is to provide a construction that will be simple and durable and cheap of manufacture.

In the drawings forming a portion of this specification, in which like numerals of reference indicate similar parts in both views, Figure 1 is a front elevation showing a vehicle equipped with the present invention, the shafts being removed. Fig. 2 is a top plan view of the front axle of the vehicle with the shafts connected thereto.

Referring now to the drawings, there is shown a vehicle comprising an axle 5, having wheels 6, and above which axle is supported a body 7 on the front spring 8 in connection with the rear springs. (Not shown.)

In the place of the usual thill-couplings there is employed at each end of the axle 5 a plate 9, which is held to the axle by means of the ordinary clips 10, which also act to hold the axle to the axletree, and from the plate 9 rise the three flanges 11, 12, and 13, the thills 14 being received between the flanges 11 and 12, in which position they are coupled by means of bolts 14, which are slidably engaged through the flanges 11, 12, and 13. Encircling each bolt 14, between the flanges 12 and 13, is a helical spring 15, which bears at one end against the flange 13 and at the opposite end against the shoulder 16 on the bolt. This spring holds the bolt normally engaged with the thill and returns the bolt to engaging position when released after being withdrawn.

Against the under side of the axle 5 and midway of the ends thereof is disposed a triangular plate 17, which is held to the axle by means of clips 18 and one angle of which triangle projects forwardly beyond the axle and is perforated. Upon the top of the spring 8 is disposed a second triangular plate 19, which is held to the spring by means of clips 20 and one angle of which plate projects forwardly beyond the spring and has a perforation which alines with the perforation of the plate 17 and in connection therewith rotatably receives a vertical shaft 21, the lower end of which is provided with a shoulder, which rests upon the plate 17, while the extremity of the shaft is keyed below the plate.

A bar 22 is secured transversely of the shaft 21 above the axle, and pivotally connected to the ends of this cross-bar are rods 23, which are connected to the adjacent ends of the bolt 14, so that when the shaft 21 is oscillated the bolts will be alternately retracted and released. To facilitate oscillation of the shaft 21, a handle-bar 24 is provided, the end portion of which is enlarged and threaded and screwed onto the upper end 25 of the shaft 21. This bar 24 lies transversely above the dashboard of the vehicle.

With the present arrangement it will be seen that the shafts are securely coupled to the vehicle under normal conditions and that when it is desired to release the horse it is only necessary to give the shaft 21 a partial rotation.

What is claimed is—

As an article of manufacture, a thill-coupling comprising a casting including a base portion having three flanges projecting from the upper face thereof, said flanges having alining perforations therethrough, the ends of the base-plate projecting beyond the ends of the flanges, and adapted for engagement of clips thereover to hold the device to an axletree, a rod slidably disposed in the perforations of the flanges and having an eye at one of its ends and a helical spring disposed between two of the flanges and connected to the rod at one end to hold the latter normally in engagement with all of the perforations, the
5 eye of the rod being adapted for attachment thereto, and means for moving the rod against the action of the spring.

In testimony whereof I affix my signature in presence of two witnesses.

ALBERT A. BRIGGS.

Witnesses:
   W. C. KITCHING,
   FILMORE GARNER.